No. 736,164. PATENTED AUG. 11, 1903.
E. B. STIMPSON.
EYELET SETTING MACHINE.
APPLICATION FILED JUNE 14, 1902.
NO MODEL. 4 SHEETS—SHEET 1.

WITNESSES: INVENTOR
Edwin B. Stimpson
BY
Henry Connett
ATTORNEY

No. 736,164. PATENTED AUG. 11, 1903.
E. B. STIMPSON.
EYELET SETTING MACHINE.
APPLICATION FILED JUNE 14, 1902.
NO MODEL. 4 SHEETS—SHEET 2.

WITNESSES:

INVENTOR
Edwin B. Stimpson
BY
Henry Connett
ATTORNEY

No. 736,164. PATENTED AUG. 11, 1903.
E. B. STIMPSON.
EYELET SETTING MACHINE.
APPLICATION FILED JUNE 14, 1902.
NO MODEL. 4 SHEETS—SHEET 3.

No. 736,164. PATENTED AUG. 11, 1903.
E. B. STIMPSON.
EYELET SETTING MACHINE.
APPLICATION FILED JUNE 14, 1902.
NO MODEL. 4 SHEETS—SHEET 4.
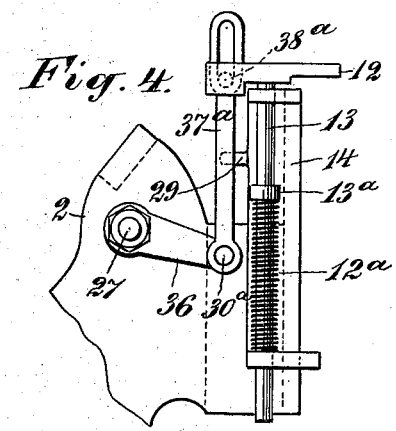
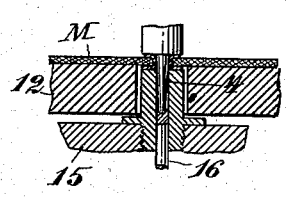
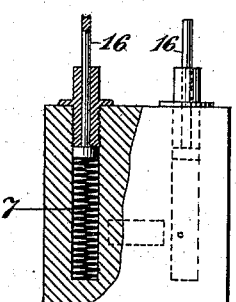
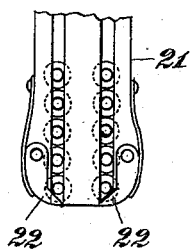
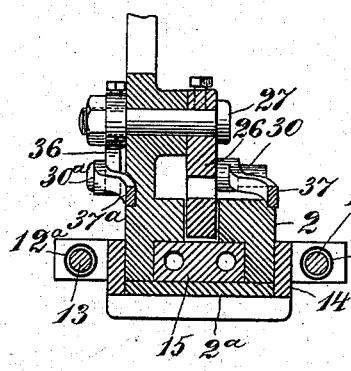
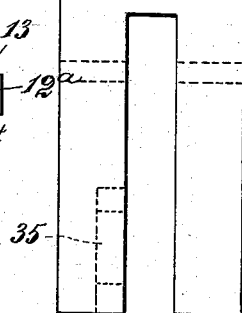
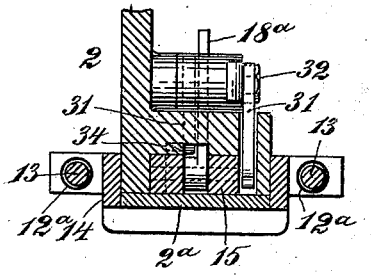
WITNESSES:
INVENTOR
Edwin B. Stimpson
BY
Henry Connett
ATTORNEY No. 736,164. Patented August 11, 1903.

UNITED STATES PATENT OFFICE.

EDWIN BALL STIMPSON, OF NEW YORK, N. Y.

EYELET-SETTING MACHINE.

SPECIFICATION forming part of Letters Patent No. 736,164, dated August 11, 1903.

Application filed June 14, 1902. Serial No. 111,603. (No model.)

*To all whom it may concern:*

Be it known that I, EDWIN BALL STIMPSON, a citizen of the United States, residing in the borough of Brooklyn, in the county of Kings and city and State of New York, have invented certain new and useful Improvements in Eyelet-Setting Machines, of which the following is a specification.

This invention relates to a machine adapted for setting eyelets, and it is herein illustrated as embodied in a machine for setting two eyelets simultaneously. The novel features of the invention will be described hereinafter and carefully defined in the claims.

Figure 1:
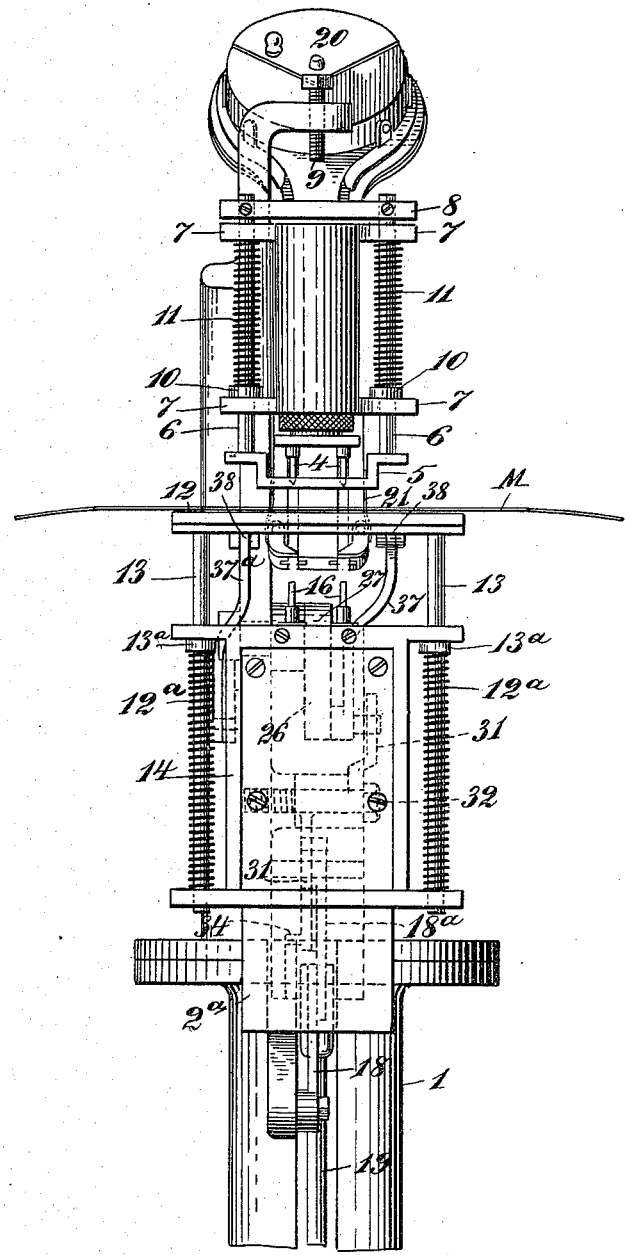
Figure 2:
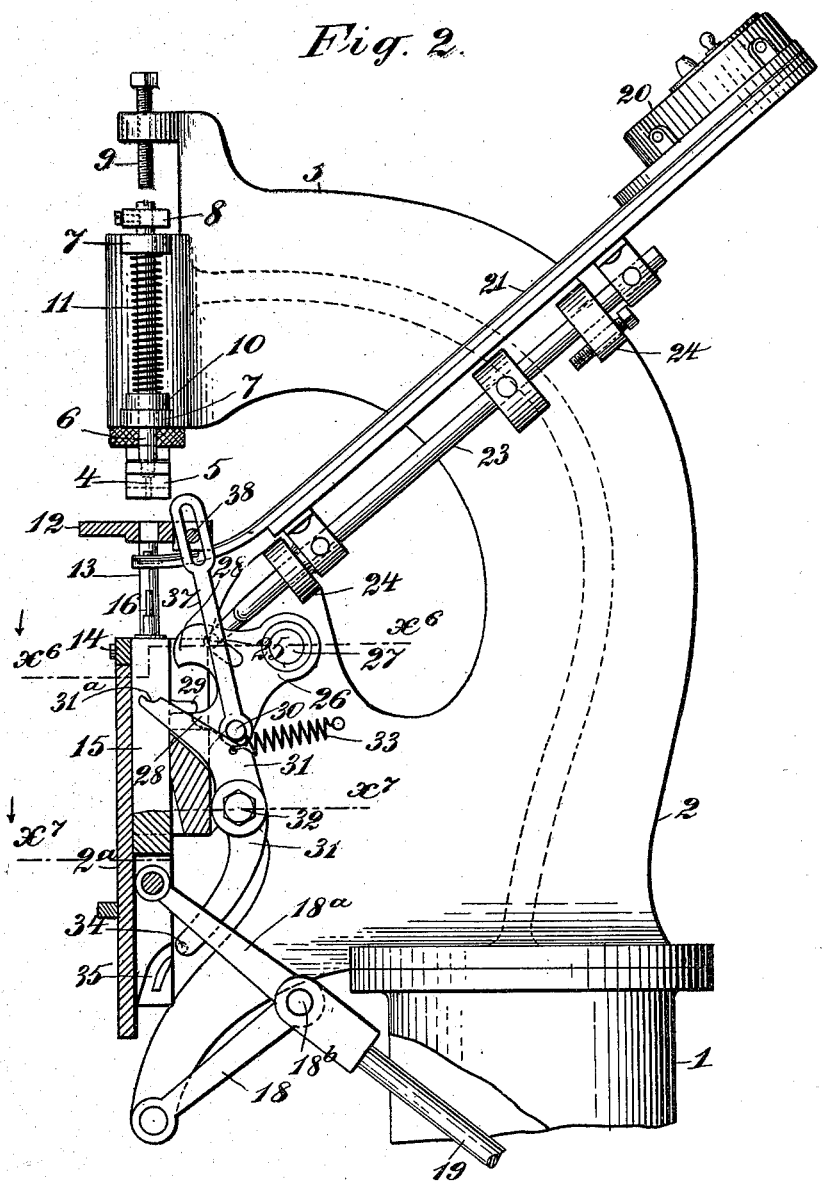
Figure 3:
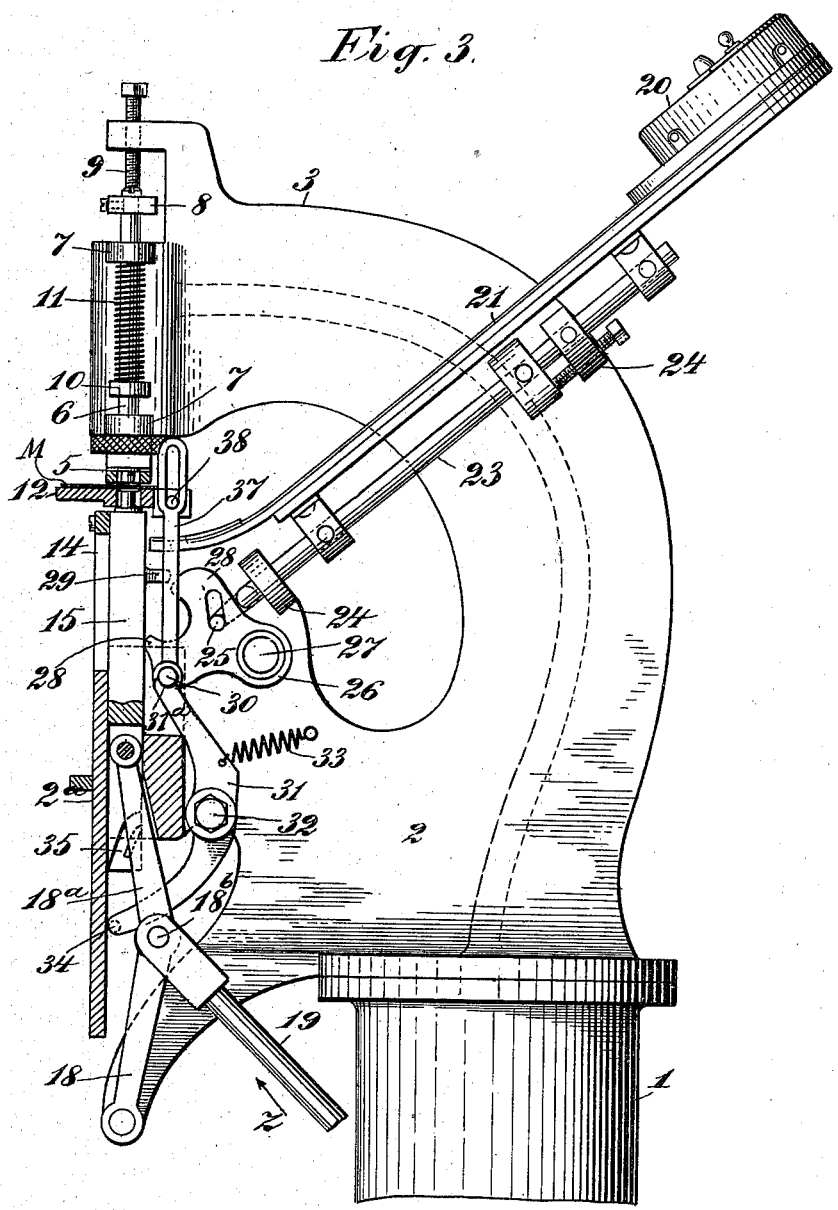

In the drawings which serve to illustrate an embodiment of the invention, Figure 1 is a front elevation of the upper part or head of the machine. Fig. 2 is a sectional side elevation of the same, showing the parts at rest or normal, as in Fig. 1. Fig. 3 is a view similar to Fig. 2, but showing the parts in the position they assume in the setting operation. Fig. 4 is a fragmentary side view of the head opposite to that seen in Fig. 2. Fig. 5 is an enlarged face view of the sliding block 15, partly broken away to show the mounting of the yielding spindles therein. Figs. 6 and 7 are cross-sections taken at the points indicated, respectively, by lines $x^6$ and $x^7$ in Fig. 2. Fig. 8 is a plan view of the end of the eyelet-track, showing the spring-detents. Fig. 9 is an enlarged sectional view showing the operation of clenching the eyelet.

1 designates the pedestal of the machine, on which is mounted the head or frame 2, which carries the working parts. In the overhanging arm 3 of the head are secured the two clenching-punches 4 4, which perforate the material or goods to receive the eyelets and clench the latter on the upper side of the goods.

In Fig. 1 the material or goods is designated by M.

5 designates a yielding presser-foot having in it apertures which house the pendent tips of the punches 4. This presser-foot has two stems 6 6, which are adapted to play through guides 7 on the arm 3. The stems are connected above by a bar 8, and an adjustable stop 9 is provided to limit the upward movement of the foot 5. Stops or collars 10 on the stems 6 limit the downward movement of the foot, which is backed by springs 11 11 on the said stems.

12 designates the work-supporting table. This table has two stems 13 13, which carry it, and these latter are guided above and below in a frame 14, which is secured to a sliding block 15, mounted in a guideway in the head 2. This guideway has a fixed front plate 2ª. The sliding block 15 has mounted in it, Fig. 5, two eyelet-spindles 16, which are slidable in the block and yielding to pressure, being backed by springs 17. These spindles are alined with the respective punches 4. The block 15 is moved upward for setting the eyelet by means of a toggle composed of links 18 18ª and an operating-rod 19, coupled to the toggle at its knuckle 18ᵇ.

It may be stated here by way of explanation that in the setting operation the rod 19 moves in the direction of the arrow $z$ thereat in Fig. 3 and that this movement of the rod may be effected in any way and by any means, so far as this invention is concerned. However, it can be stated that in some cases with this general class of machines the operation is effected by a treadle under the foot of the operator and in other cases by power applied to a continuously-running shaft, a treadle being employed to control a clutch which couples said shaft to a crank to which the rod 19 is coupled. These are both known mechanisms familiar to those skilled in the art.

20 designates the eyelet-box, and 21 the inclined eyelet-track. This latter is double and conveys two rows of eyelets down to the respective points where the spindles 16 may pass up through the terminal eyelets in the tracks when the block 15 ascends. Each trackway has at the end of the track (see Fig. 8) a spring-detent 22, which arrests the terminal eyelet, but permits it to disengage itself from the trackway when the track is moved back out of the path of the block 15, as will now be explained.

The eyelet-track is mounted on a slide-bar or carriage 23, which is mounted in guides or bearings 24 on the head of the machine. The lower end of this carriage is coupled by a slot and stud at 25 to a rocker 26, fixed on a rock-shaft 27. By operating this rocker the eyelet-track is moved to and fro. The rocker 26 has two jaws 28, and on the sliding block 15 is a stud 29 in the same path with said jaws, whereby when the block is moved upward the said stud at the proper time engages the upper one of the jaws 28 and acts through the rocker 26 to move backward and upward the eyelet-track 21. This operation takes place after the spindles 16 have engaged the eyelets in the end of the track.

In the rocking of the rocker 26, as above described, a stud 30 in the rocker is made to engage a recess $31^a$ in the upper end of a detent-lever 31, fulcrumed at 32 on the head of the machine and having a spring 33. When the block 15 is down, as in Fig. 2, the edge or side of the detent-lever is held up against the stud 30 by its spring; but when the block is elevated, as in Fig. 3, the recess $31^a$ engages and takes under the stud 30, and the detent-lever supports the rocker 26 and holds the eyelet-track withdrawn. Under the conditions seen in Fig. 3 the curved lower arm of the lever-detent 31 moves in under the elevated block 15, and a stud 34, projecting laterally from the lever, is put into the path of the open lower end of a cam-groove 35 in one wall of a slot in the said block. When the block 15 descends, the cam-groove 35 engages the stud 34 and by rocking the lever-detent disengages it from the stud 30, distends the spring 33, and frees the rocker 26, thus permitting the eyelet-track to descend and advance; but it will be noted that the detent-lever has a straight bearing-face between the recess $31^a$ and the point below where the spring 33 is secured and that this face is inclined at all times to the upright path of the block 15, and it will also be noted that in the descent of the said block the cam-groove 35 when engaging the stud 34 in the descent of block 15 acts to disengage the detent-lever from the stud 30 and gradually move the upper arm of said detent-lever to the left in Figs. 2 and 3, thus allowing the stud 30 to slide down along the inclined face of said lever, and so permit the eyelet-track to move forward to the position seen in Fig. 2 easily and gradually.

When the block 15 is moved upward in the setting operation, it carries up with it the work-table 12 and the goods thereon. The table presses the goods up against the presser-foot 5, which yields upwardly and allows the punches 4 to pierce the goods. When the foot reaches the limit of its upward movement, controlled by the stop 9, the work-table is arrested and the block 15 is permitted to continue its further upward movement by the yielding of supporting-springs $12^a$ of the table. It may be explained here that the springs $12^a$, which embrace the stems 13, carrying the work-table, are stronger than the springs 11 of the presser-foot and also that on the stems 13 are stop-collars $13^a$, which bear on the frame 14 and limit the elevation of the work-table when the machine is at rest, as in Figs. 1 and 2.

When the work-table has been moved upward in the setting operation, it is desirable that it shall be held elevated until the block 15 and the spindles 16 carried thereby shall have descended far enough to withdraw the spindles from the clenched eyelets, and to effect this the device now to be described is employed.

The shaft 27 extends through the metal of the head 2 and rocks therein. On one of its ends is secured the rocker 26 and on the other end an arm or crank 36. Coupled at its lower end to the stud 30 in the rocker 26 is a strut 37, which extends upward and has a forked or slotted connection to a stud or pin 38 in the work-table, and coupled by its lower end to a pin or stud $30^a$ in the arm 36 is a similar strut $37^a$, which has also a slotted or forked connection to the work-table through a pin or stud $38^a$. Now when the parts are in their normal positions, as in Fig. 2, the said struts will be idle; but when the shaft 27 is rocked in the setting operation the struts will be elevated until the lower ends of the slots in their upper ends take under the respective studs 38 $38^a$ in the work-table, and thus support said table, as indicated in Fig. 3.

It may be explained here that the slots or forks in the upper ends of the said struts will be deep or long enough to permit the work-table to be lifted (by the block 15) to a limited extent without disengaging the studs or pins on the work-table from said slots. This movement is necessary, as the stud 29 on the block does not engage the upper jaw 28 on the rocker until the block 15 moves upward far enough for the spindles 16 to engage the terminal eyelets in the track. The lower jaw 28 is provided, so as to assure the return of the eyelet-track when the block 15 descends. The carriage 23 is frictionally mounted and may not move forward on the return by gravity. The carriage may have suitable stops to limit its movements to and fro.

The eyelet-spindles 16 may be concave at their tips, as seen in Fig. 5, so as to better fit them to receive the points of punches or perforators 4.

This invention is not restricted to the specific details of construction herein shown in all respects. For example, the coupling of the strut 37 to the particular stud 30 in the rocker is not essential. So long as it is coupled to the rocker it will suffice. Some of the features of the invention are adapted to eyelet-setting machines where one or a plurality of eyelets are set simultaneously, and these are not confined to a machine for setting two eyelets at a time. Preferably the movements of the parts will be in a vertical plane; but this is not essential to the invention. Hence the terms "upward," "downward," and the like used in describing the operation of the parts are merely descriptive of the machine as shown in the drawings.

It will be noted that the purpose and function of the detent device 31 is not alone to support the eyelet-track and work-table during the setting operation, but to hold or detain these parts until after the block 15 shall have descended to a predetermined extent.

Having thus described my invention, I claim—

1. In an eyeleting-machine, the non-yielding punch, the yielding presser-foot, the sliding block carrying the eyelet-spindle, the said spindle mounted yieldingly in the block and alined with the punch, the work-table mounted yieldingly on said block and carried by the latter, the eyelet-box and its gravity-track, means for moving said track backward and upward, an automatic detent for supporting the track when so displaced, during the setting operation and for a limited period after the eyelet-spindle shall have begun its return movement, and positive means for gradually and uniformly retarding the eyelet-track in its forward movement.

2. In an eyeleting-machine, the non-yielding punch, the yielding presser-foot, the sliding block carrying the eyelet-spindle, the said spindle mounted yieldingly in the block and alined with the punch, the work-table mounted yieldingly on said block and carried by the latter, the eyelet-box and its track, automatic means for displacing said track and supporting it in its displaced position during and after the setting operation, and automatic means for supporting the work-table non-yieldingly during and after the setting operation.

3. In a machine for the purpose specified, the reciprocating block carrying the eyelet-spindle, the said spindle, the work-table mounted yieldingly on said block, the displaceable track, the rocker which displaces said track, means whereby said reciprocating block, in its movements, actuates said rocker, a detent which supports said rocker during and after the setting operation and which is displaced by the block in its return movement, and means between the rocker and the work-bed which supports the latter non-yieldingly during the setting operation.

4. In a machine for the purpose specified, the reciprocating sliding block, the work-table carried thereby, the rocker, means whereby the block in its movements actuates the rocker, and the supporting-strut coupled to the rocker and having a slotted connection with the work-table.

5. In a machine for the purpose specified, the reciprocating sliding block 15, having in it a cam-groove 35, the spring lever-detent 31 having a stud 34 to engage said groove when the block descends, whereby said detent-lever is rocked, the rocker 26, means whereby the block, in its ascent, puts the said rocker in position to be supported by the lever-detent, the work-table mounted on and carried by said block, and the supporting-strut for said table, coupled to the said rocker below and to the work-table above.

6. In a machine for the purpose specified, the slidable eyelet-track, the reciprocating sliding block having in it a cam-groove, the rocker coupled to the said track, the spring detent-lever provided at its lower end with a stud which engages said cam-groove, at its upper end with a recess to engage some part of the rocker, and an oblique face below said recess, and means whereby the said block, in its ascent, puts the rocker in position to be supported by the detent-lever, the oblique face on the said detent-lever serving to retard and regulate the forward movement of the eyelet-track.

7. A machine for the purpose specified having means for supplying the eyelets, means for carrying up and clenching the eyelets, a work-supporting table which moves upward with the eyelets in the setting operation, its supporting-springs and means independent of said springs for detaining the said table unyieldingly in its elevated position until after the eyelet-carrying devices shall have descended nearly to their lowest position.

In witness whereof I have hereunto signed my name, this 12th day of June, 1902, in the presence of two subscribing witnesses.

EDWIN BALL STIMPSON.

Witnesses:
PETER A. ROSS,
WILLIAM J. FIRTH.